United States Patent
Marcio et al.

[15] 3,680,371
[45] Aug. 1, 1972

[54] FIELD TEST UNIT FOR A GAS TURBINE FUEL INJECTION SYSTEM

[72] Inventors: Roger A. Marcio, New Haven; Orrin J. Winton, Bridgeport, both of Conn.

[73] Assignee: Avco Corporation, Stratford, Conn.

[22] Filed: Feb. 16, 1971

[21] Appl. No.: 115,183

[52] U.S. Cl. ..................................73/119 A, 73/168
[51] Int. Cl. ..............................................G01m 15/00
[58] Field of Search..........73/119 A, 168, 3; 222/399

[56] References Cited

UNITED STATES PATENTS 1,750,512  3/1930  Ewald........................222/400.7
2,066,397  1/1937  Fogarty......................222/395 X
2,504,009  4/1950  Phillips et al...........222/400.7 X

*Primary Examiner*—Jerry W. Myracle
*Attorney*—Charles M. Hogan and Gary M. Gron

[57] ABSTRACT

A unit is disclosed for field testing the nozzle manifold and fuel starting nozzles of a gas turbine engine. A portable case has a tank that is filled with fuel and pressurized to a predetermined level. The output of the tank is connected to the engine fuel nozzle manifold to test fuel distribution from the main nozzles. The engine starting nozzles are placed on a protractor nozzle support assembly to determine visually their spray pattern.

2 Claims, 2 Drawing Figures

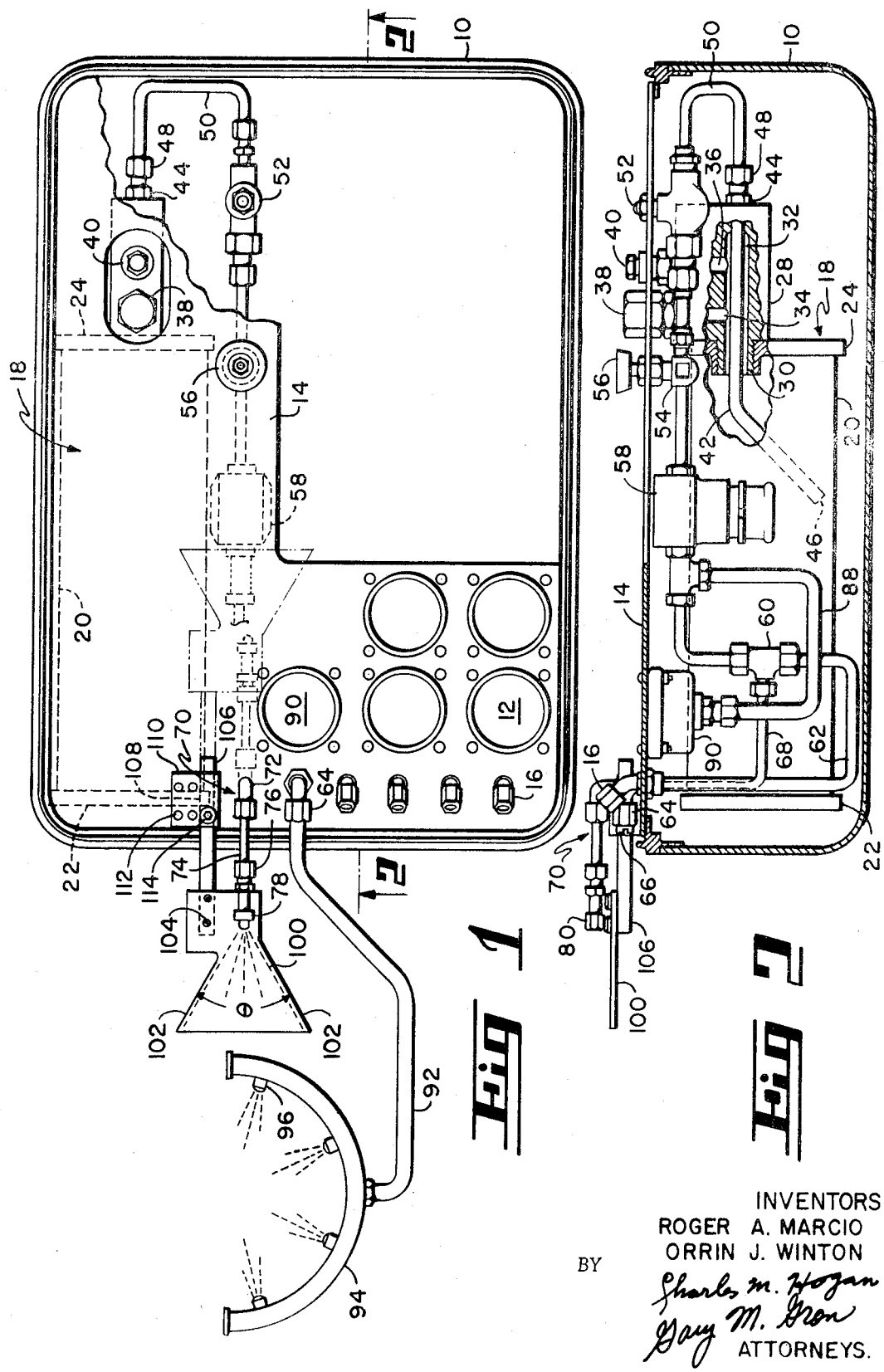

FIELD TEST UNIT FOR A GAS TURBINE FUEL INJECTION SYSTEM

The present invention relates to the testing of gas turbine engines and more particularly to the fuel systems used in this type of engine.

The gas turbine engine from its very inception has been a highly complicated machine requiring sophisticated maintenance procedures. The need for complicated instrumentation and special tooling requires that engines be sent to major service and overhaul facilities, thereby substantially increasing the time and expense of engine maintenance. This has been particularly true of gas turbine fuel systems where the many conduits, nozzles and controls need to be disassembled and tested with bench units to determine their performance.

Accordingly, it is an object of the present invention to enable the quick, efficient and effective testing of the fuel system of a gas turbine engine in the field.

These objects are achieved by a field test apparatus comprising a portable case which has in it a component for supplying a source of fuel at a predetermined sufficient pressure to cause flow through the components of the fuel injection system. A conduit assembly extending from the fuel supply component can be connected to an engine main nozzle manifold or a fuel starting nozzle so that their flow characteristics can be tested.

The above and other related objects and features of the present invention will be apparent from a reading of the description of the disclosure shown in the accompanying drawing and the novelty thereof pointed out in the appended claims.

In the drawing:

FIG. 1 is a plan view of a field test unit embodying the present invention, along with several gas turbine engine fuel system components that may be tested by the unit;

FIG. 2 is a section view of the field test unit shown in FIG. 1, taken on lines 2—2 of FIG. 1.

Referring now to FIGS. 1 and 2 there is shown a field test unit comprising a portable case 10 which is used to house the components of the field test unit. The unit is shown in its test condition in FIG. 1 but for transport conditions has a suitable cover (not shown) to protect the components of the unit.

The test unit has a series of pressure gauges 12 mounted to a cover 14 on case 10. The gauges are connected by conduits (not shown) to couplings 16 extending from cover 14. The couplings are connected to various equipment in the engine to enable a determination of their performance, such as: the pressure output of a fuel pump; the output of a hydraulic pump; or the pressure required to display a particular actuating device. These items are mentioned only to indicate that the case 10 may incorporate testing equipment other than the fuel injection testing apparatus particularly described below.

The apparatus for testing the fuel system components of the gas turbine engine includes a tank 18 formed by a cylinder 20 having a first end plate 22 and a second end plate 24. The end plates 22, 24 form an interior chamber 26. A valve housing 28 is threaded into opening 30 in end plate 24. A longitudinal passageway 32 extends through housing 28 and opens into the interior chamber 26. A pair of passages 34 and 36 extend at right angles from passage 32. A removable cap 38 is provided over the end of passageway 34 to permit the placing of fuel into chamber 26 via passage 34. A valve 40 is mounted over the end of passageway 36. Valve 40 permits pressurization of chamber 26 by connecting a pressurizing line to valve 40 and twisting it to an open position. The valve 40 is twisted to a closed position before the pressurizing line is removed from valve 40 to hold the tank pressure. A suitable valve for this purpose is marketed by the Schrader Division of the Scovill Manufacturing Company, Nashville, Tennessee, under the part designation No. 798, also MS 28889–1.

A conduit 42 is spaced from the walls of and extends through longitudinal passage 32 from a fitting 44 in an outer wall of housing 28 and is bent to provide an inlet 46 in the lower portion of chamber 26. A coupling 48 connected to fitting 44 has a conduit 50 which leads to a T-connection 60. A pressure release valve 52 and an operator manipulated flow control valve 54 are interposed in conduit 50. Flow through valve 54 is permitted or blocked by twisting an operator manipulated knob 56. A fuel filter 58 is downstream of the flow control valve 54. A conduit assembly 88 extends from conduit 50 downstream of the filter 58 to a pressure gauge 90.

A conduit 62 extends from one branch of the T connector 60 to an outlet connector 64. Fitting 64 is adapted to receive a flexible conduit 92 which extends to a main fuel nozzle manifold 94 having a series of nozzles 96 connected to it. When the main fuel manifold is not being tested a cap 66 is provided, as shown in FIG. 2.

A second conduit 68 extends from the T connector 60 to a nozzle support unit 70 which comprises a generally L-shaped base 72 and an extension conduit 74 leading to a fitting 76 that receives a fuel starting nozzle 78, as shown in FIG. 1. When a starting nozzle is not in place a cap 80 is threaded onto element 76, as shown in FIG. 2.

The spray pattern of the starting nozzle 78 is determined by a protractor 100 having exterior diverging sides 102. The angle $\theta$ that the sides 102 make with one another is selected to coincide with the spray pattern of a properly functioning nozzle 78. Protractor 100 is secured by screws 104 to an arm 106. Arm 106 is slidably received in a passage 108 in a mounting block 110 secured to cover 14 by screws 112. A set screw 114 enables the position of arm 106 to be adjusted.

A gas turbine engine fuel system is tested using the field test apparatus in the following manner. Cap 38 is removed to uncover passage 34 and chamber 26 is filled with a sufficient amount of fuel. Cap 38 is replaced over passage 34 and an air pressure line (not shown) is connected to the valve 40 with caps 66 and 80 on connectors 64 and 76, respectively and flow control valve 54 open. The valve 40 is twisted to an open position and the tank is pressurized to a level which is sufficient to produce flow through the fuel injection components to be tested.

This level is generally below the normal operating pressures of the present fuel system but it is more than sufficient to produce uniform flow in the manifold and the nozzles. It has been found that pressures of around 100 p.s.i. provide quite acceptable results. Once the pressure in chamber 26 has reached the predetermined level, as observed on gauge 90, the valve at 40 is twisted to a closed position and the air pressurizing line is removed from valve 40. The knob 56 on valve 54 is twisted to a closed position and either the starting nozzle or the nozzle manifold is tested.

Assuming that the fuel manifold is tested first, the cap 66 is removed from fitting 64 and the flexible line 92 connected. The fuel nozzle manifold which for most engines is readily removable from the engine as a unit, is placed in a position to be observed by the operator of the equipment. The knob 56 on valve 54 is opened to permit flow through the nozzle manifold 94 and the distribution and performance of flow through the nozzles 96 is visually determined. It has been found that fuel nozzle clogging can be quickly spotted using this technique.

Once this operation has been completed, valve 54 is closed, conduit 92 removed and cap 66 placed on fitting 64. After this is done, cap 80 is removed from fitting 76 and a starting nozzle 78, which is also easily removed from most engines, is threaded onto fitting 76. The protractor 100 and its supporting arm 106 are adjusted by means of the set screw 114 to line up the point of convergence of the sides 102 at the nozzle opening. After this is done the knob 56 is manipulated to permit flow through the nozzle assembly. The spray pattern from the nozzle is visually determined using the sides 102. If the pattern just covers the protractor 100 it is properly functioning. A spray cone angle outside or inside the sides 102 indicates plugging or another malfunction. When this test has been completed valve 54 is closed, the nozzle 78 removed and cap 80 placed on fitting 76.

When the field test of the fuel injection equipment has been completed the protractor 100 and supporting arm 106, extending outboard of the case 10, are removed from passage 108 and inserted from the opposite end of passage 108 so that the protractor 100 and arm 106 are entirely contained within the bounds of case 10, as shown by the phantom lines in FIG. 1. In like manner the nozzle support fitting 76 and arm 74 are pivoted to the phantom position of FIG. 1 so that they are completely contained in the limits of case 10. The unit is thus ready for transport until such time as the fuel injection components are to be tested when the above procedure would be reversed.

The above unit provides a highly effective and rapid means of field testing the most important fuel injection components of a gas turbine engine in the field. The use of the pressurized tank enables a highly accurate and repeatable fuel flow and pressure in order to provide accurate results. The starting nozzle support and the protractor are quickly positioned outboard of the case 10 so that the fuel thus discharged will not spill onto the unit. However, these units are quickly placed in a transport position to enable a compact unit for transport.

While the preferred embodiment of the present invention has been described, it is apparent to those skilled in the art that other modifications may be performed without departing from its spirit and scope.

Having thus described the invention, what is claimed as novel and desired to be secured by Letters Patent of the United States is:

1. Apparatus for field testing the fuel injection system of a gas turbine engine, said apparatus comprising:
   a portable case;
   a tank mounted within said case;
   a valve element housing integral with one end of said tank, said valve housing having a longitudinal bore formed therein having a first closed end and a second end open to the interior of said tank and a pair of passageways extending from said longitudinal bore generally at right angles thereto;
   releasably attached caps for said right angle passageways, one permitting the entrance of fuel and the other permitting the entrance of air under pressure;
   a conduit spaced from the walls of and extending from the exterior of said valve element housing through the first end of said longitudinal bore and through the second end of said bore to a bottom portion of the tank;
   an operator-manipulated flow control valve series connected to and downstream of said tank for controlling flow of fuel therefrom;
   conduit means extending from said flow control valve and having a pair of outlets for enabling selective application of the output thereof to an engine main nozzle manifold and to fuel starting nozzle whereby the flow characteristics of said assemblies may be tested;
   means on said case for releasably supporting a fuel nozzle at one outlet of said conduit means;
   a protractor having divergent sides with a predetermined angle therebetween;
   means for releasably supporting said protractor adjacent said nozzle support means in a first position extending outward from said casing for testing said nozzle and a second position fully contained within said case for transport therewith;
   said nozzle support means comprising a conduit extending from said conduit means and being pivotal from a first position extending outward from said casing for testing said nozzle and a second position wherein said nozzle is fully contained within said case.

2. Apparatus as in claim 1 wherein said releasable mounting means comprises:
   a support having a passage therethrough opening on one side toward the exterior of said case and on the other side toward the interior of said case;
   an arm supporting said protractor and slidable into said passageway from either end; and
   a set screw releasably holding said arm in said passageway whereby in said first position said shaft is inserted in said passageway from the exterior of said case and in said second position said shaft is inserted in said passage from the interior portion of said case.

* * * * *